(12) United States Patent
Nock et al.

(10) Patent No.: US 8,777,314 B2
(45) Date of Patent: Jul. 15, 2014

(54) VEHICLE SEAT FOLD MECHANISM

(75) Inventors: Eckhard Nock, Schweitenkirchen (DE); Johannes Barzen, Pfaffenhofen (DE); Thomas Buchner, Altfraunhofen (DE)

(73) Assignee: Lear Corporation, Southfield, MI (US)

( * ) Notice: Subject to any disclaimer, the term of this patent is extended or adjusted under 35 U.S.C. 154(b) by 94 days.

(21) Appl. No.: 13/439,399

(22) Filed: Apr. 4, 2012

(65) Prior Publication Data

US 2012/0280548 A1 Nov. 8, 2012

(30) Foreign Application Priority Data

May 6, 2011 (DE) .......................... 10 2011 075 375

(51) Int. Cl.
*B60N 2/12* (2006.01)
(52) U.S. Cl.
USPC ...................................... 297/341; 297/378.12
(58) Field of Classification Search
USPC .................... 297/341, 378.1, 378.12, 378.14
See application file for complete search history.

(56) References Cited

U.S. PATENT DOCUMENTS

| | | | |
|---|---|---|---|
| 4,076,309 A | 2/1978 | Chekirda et al. | |
| 5,695,247 A * | 12/1997 | Premji | ........................ 297/341 |
| 5,842,744 A | 12/1998 | Harmon | |
| 6,767,063 B1 | 7/2004 | Abdella et al. | |
| 6,926,362 B2 * | 8/2005 | Kroner et al. | ............ 297/354.12 |
| 7,021,716 B2 * | 4/2006 | Persad et al. | ............ 297/378.12 |
| 7,172,253 B2 | 2/2007 | Haverkamp | |
| 7,547,070 B2 | 6/2009 | Nathan et al. | |
| 7,628,441 B2 | 12/2009 | Quast | |
| 7,819,479 B2 * | 10/2010 | Halbig et al. | ............ 297/378.14 |
| 2010/0060064 A1 | 3/2010 | Kienke et al. | |

FOREIGN PATENT DOCUMENTS

| | | |
|---|---|---|
| CN | 1781760 A | 6/2006 |
| DE | 19913432 A1 | 9/2000 |
| DE | 102004021673 A1 | 12/2005 |
| JP | 2010132069 A | 6/2010 |
| WO | 03004307 A1 | 1/2003 |

OTHER PUBLICATIONS

Chinese Office Action for corresponding Application No. 201210134171.4, mailed Feb. 7, 2014, 6 pages.

* cited by examiner

*Primary Examiner* — Sarah B McPartlin
(74) *Attorney, Agent, or Firm* — Brooks Kushman P.C.

(57) ABSTRACT

A vehicle seat assembly has a seat base, a seat back pivotally connected to the seat base and being movable between an upright and a folded position, a spring member connected to the other of the seat base and the seat back, and a follower rotatably connected to the spring member. One of the seat base and the seat back define a cam surface. The spring member is compressed by the follower engaging the cam surface. The follower engages the cam surface when the seat back is in the folded position.

18 Claims, 3 Drawing Sheets

VEHICLE SEAT FOLD MECHANISM

CROSS-REFERENCE TO RELATED APPLICATIONS

This application claims foreign priority benefits under 35 U.S.C. §119(a)-(d) to DE 10 2011 075 375.3, filed May 6, 2011, which is hereby incorporated by reference in its entirety.

TECHNICAL FIELD

The disclosure relates to a mechanism for a vehicle seat assembly having a walk in or easy entry mechanism.

BACKGROUND

A vehicle seat assembly may be provided with a mechanism to fold the seat back relative to the seat base. Examples of seat folding mechanisms are disclosed in U.S. Pat. Nos. 5,842,744, 6,767,063, 7,172,253, 7,547,070, 7,628,441, and 7,819,479, and U.S. Publication No. 2010/0148557.

SUMMARY

In various embodiments, a vehicle seat assembly is provided with a seat base, a seat back pivotally connected to the seat base and being movable between an upright and a folded position, a spring member connected to the other of the seat base and the seat back, and a follower rotatably connected to the spring member. One of the seat base and the seat back define a cam surface. The spring member is compressed by the follower engaging the cam surface and causes the seat base to translate before the seat back rotates when returning the seat to the upright position.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
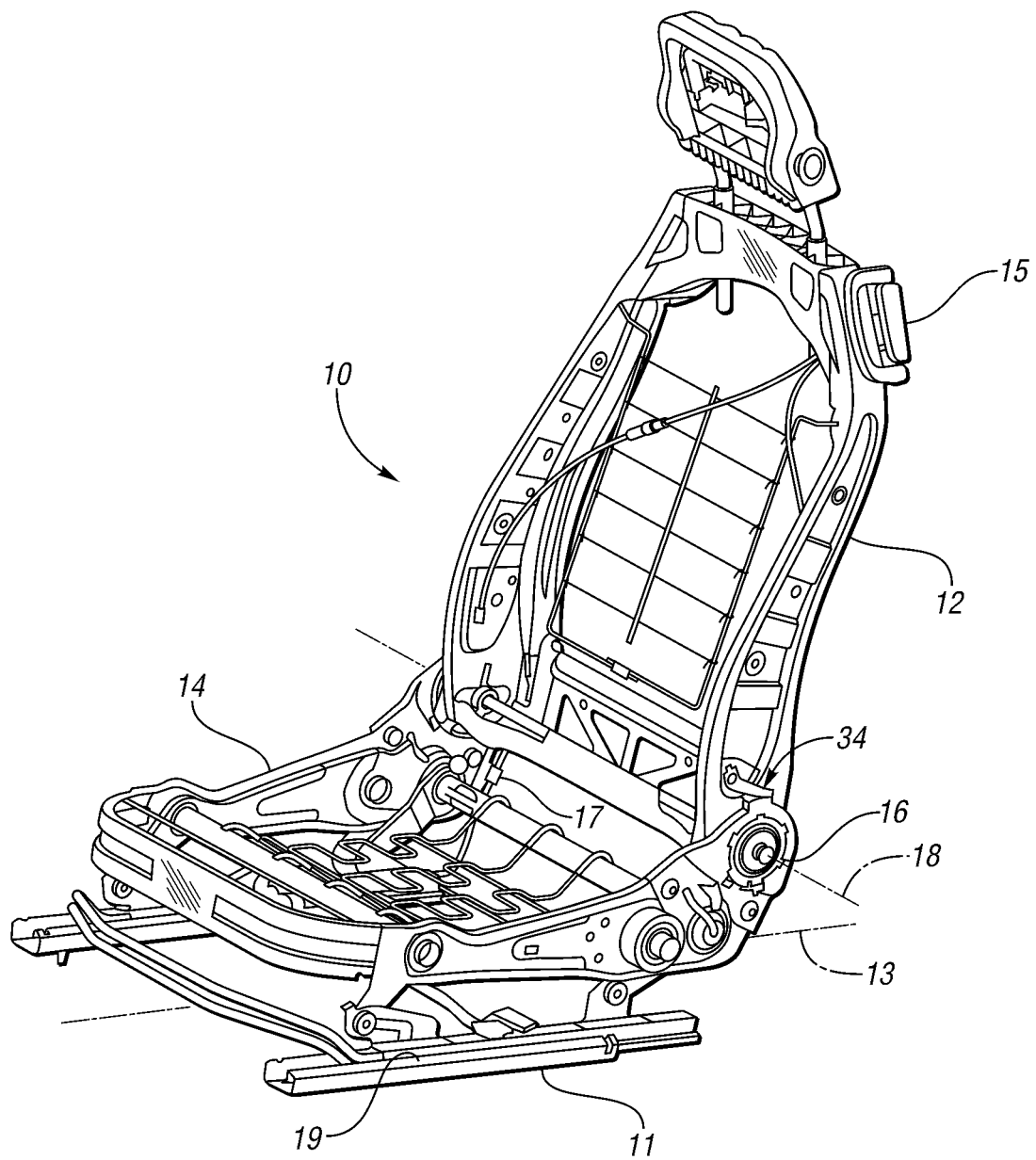
FIG. 1 is a schematic of a vehicle seat assembly.

FIG. 1 illustrates a vehicle seat assembly 10 having a seat back 12, a seat base 14, a sliding track mechanism 11, and a seat release mechanism 16. The seat back 12 is pivotally connected to the seat base 14 such that the seat back 12 can fold forward to allow for ingress to or egress from a vehicle seat assembly or seating row positioned aft of the vehicle seat assembly 10 in a vehicle, to provide storage of items over the seat back, or the like. For example, the vehicle seat assembly 10 is in the front of the vehicle for a driver or passenger, and the seat back 12 is pivoted or folded forward about a pivotal axis 18 to allow a passenger to get into or out of a rear seating row or to access cargo in a rear seating row of the vehicle. Alternately, the folding mechanism 16 may be used with a vehicle seat assembly 10 in a second row of seats to gain access to a third row.

As illustrated in FIG. 1, the seat base 14 may also translate along the sliding track mechanism 11 in the fore/aft direction 13. For example, the seat release mechanism 16 has a lever 15, handle, or other mechanism, that a user engages to release the seat back 12. The lever 15 is connected to the seat release mechanism 16 to release the mechanism 16 and allow the seat back 12 to pivot, or fold forward, with respect to the seat base 14. The seat release mechanism 16 is connected to the sliding track mechanism 11 by a linkage 17, such as a Bowden cable, or the like. As the seat back 12 folds forward, the linkage 17 is tensioned, or otherwise engaged, such that the sliding track mechanism 11 is released and the seat base 14 slides forward on the tracks 19. This combination of the seat back 12 pivoting and the seat base 14 sliding forward provides additional clearance to the area in a vehicle behind the seat 10, i.e. to a second row of seats, and places the seat 10 in an walk in or easy entry configuration.

The seat back 12 is movable between an upright position as shown in FIG. 1 and a folded position with the seat back 12 pivoted towards the seat base 14 about the axis 18, and the seat base 14 translated in a forward direction along axis 13. The degrees of pivotal motion and amount of translational motion of the seat 10 may vary based on the design criteria for the vehicle seat assembly 10 and the clearance permitted by the structure of the seat back 12 and the seat base 14 and the vehicle. For example, the seat back 12 may fold approximately ninety degrees, although motion through more than or less than ninety degrees is also contemplated.

In the prior art, to return the seat back 12 to the upright position, the user unfolds the seat back 12 and places it in the upright position. The seat base 14 remained locked in the forward position, and the sliding track mechanism needed to be activated by the user to slide the seat base 14 rearward along the tracks 11 to the starting position. Alternatively, where the seat base 14 was not locked in the folded position, a linear sliding mechanism was used with the seat recline mechanism 16, which caused the seat base 14 to slide rearward after or while the seat back 12 was being unfolded. The linear sliding mechanism caused a sliding friction force due based on sliding plates or other members, required lubrication, and often had wear caused by the direct sliding contact. The seat base 14 did not always reach a rearward locked position on the tracks 19 if cargo or the like was impeding the rearward sliding motion, thereby causing the seat 10 to potentially slide or move on the tracks 19 when occupied.

Additionally, some prior art seats have a spring continuously biasing the seat back forward, with the recliner mechanism retaining the seat back in the upright position and the spring folding the seat back when the mechanism is released. If a spring is used with a seat 10 according to various present embodiments, the spring has a relatively low spring force constant, as it would otherwise create too high of a spring force when the seat is in the use position with the seat back 12 upright. This corresponds to a relatively low spring force exerted on the seat back 12 when the seat back 12 is folded forward.

Figure 2:
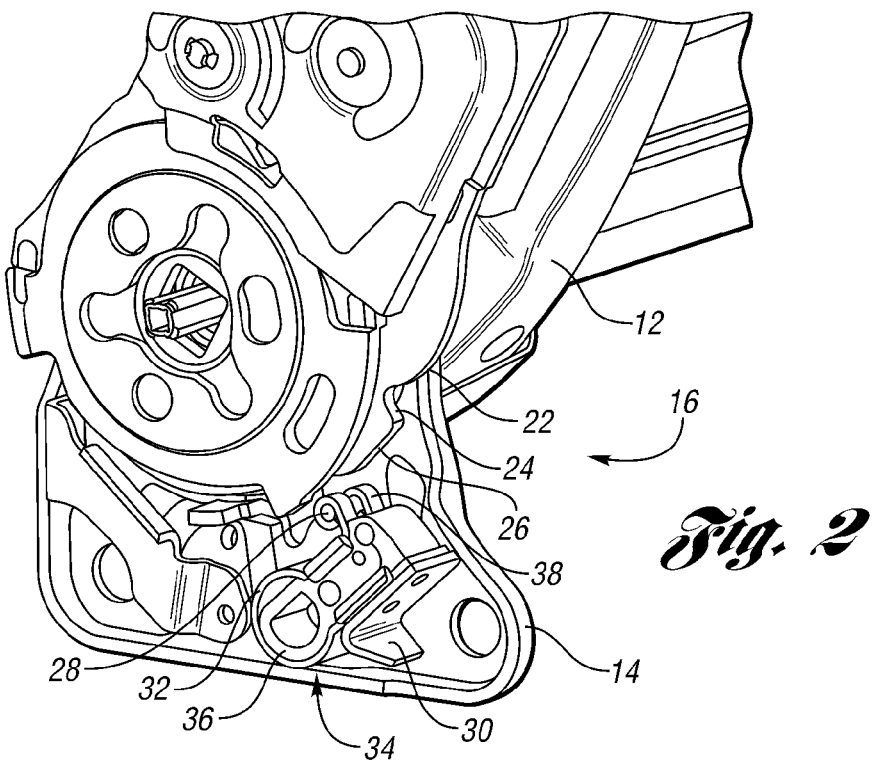
FIG. 2 is a schematic of a mechanism assembled with a seat assembly according to the present disclosure.

An embodiment of a seat release mechanism 16 for use with a vehicle seat assembly 10 is shown in FIG. 2. The seat release mechanism 16 is located at the junction of the seat back 12 and the seat base 14. The seat release mechanism 16 may contain features to provide for various recline angles of the seat back 12 with respect to the seat base 14 as are known in the art. A cam surface 22 is defined by the seat back 12 or a piece of the mechanism 16 extending from the seat back 12. The cam surface 22 has a concave arcuate portion 24, or first portion, and a second portion 26, which may be linear, convex arcuate, or any other profile shape as is known in the art. The arcuate portion 24 may have various curved portions, ramps, linear portions, and the like. A follower 28 is connected to the seat base 14 and follows the cam surface 22 as the seat back 12 pivots with respect to the seat base 14. The follower 28 is connected to the seat base 14 using a plate 30 and a spring member 32.

The spring member 32 is compressed by the follower 28 engaging the cam surface 22. As the profile of the cam surface 22 changes, the amount of force, or the amount of compression of the spring 32, changes as the follower 28 moves along the cam surface 22. For example, the follower 28 moving from the first portion 24 to the second portion 26 involves a large amount of compression of the spring 32 over a short distance of the cam surface 22, since it is a steep profile. The steep portion of the profile causes a first amount of force to be required to cause the spring 32 to compress and the follower 28 to roll, and the first amount of force is higher than the force required as the follower 28 travels along the second portion 26.

When the seat back 12 is in the upright position the follower 28 is engaged with the second portion 26 of the cam surface 22, or alternatively, not engaged with the cam surface 22. When the seat back 12 is not in the locked upright position (i.e. between the upright position and the folded position), the follower 28 is engaged with second portion 26 of the cam surface 22. When the seat back 12 is in the folded position, the follower 28 is engaged with the first portion 24 of the cam surface 22.

When the seat back 12 is in the folded position, or not in the upright position, the seat back 12 is freely pivotable by a user without interacting with the lever 15 of the seat release mechanism 16. For example, the seat back 12 is in the folded position, or the follower 28 is somewhere along the cam surface 22, and the user can move the seat back 12 relative to the seat base 14 and or the seat base 14 relative to the tracks 19 by only imparting a force on the seat back 12.

To move the seat back 12 from the upright position to the folded position, the user engages the lever 15, which releases the seat release mechanism 16 causing the seat back 12 to fold forward and the follower 28 to travel along the cam surface 22 to the first portion 24 of the cam surface 22. The seat back 12 folding forward tensions the linkage 17, which releases the seat track mechanism 11 and causes the seat base 14 to slide forward on the tracks 19 to an "easy entry" position.

To return the seat back 12 to the upright position from the folded position, the user exerts a force on the seat back 12 as if to pivot the seat back 12 from the folded position and towards the upright position. The follower 28 is in contact with the first portion 24 of the cam surface 22, and a certain amount of force is required to compress the spring 32 to allow to follower 28 to exit the concave portion 24 and continue to travel along the cam surface 22. This force delays the seat back 12 unfolding, and allows the seat base 14 to travel rearward along the tracks 19 such that the seat base reaches a locked position in the tracks 19 before the seat back 12 begins to pivot to an upright position.

Once the seat base 14 has translated rearward and locked into position, the force on the seat back 12 from the user causes the spring 32 to compress sufficiently to allow the follower 28 to move from the arcuate portion 24 to the second portion 26 such that the seat back 12 continues to pivot to the upright position relative to the seat base 14 and is then locked by the seat recline mechanism 16 in the upright position. The movement of the seat back 12, from the folded position to the upright position, may be done without the user touching any portion of the seat assembly 10 except the seat back 12. The user does not have to actuate or interact with the lever 15 for the seat release mechanism 16 to reposition the seat 10 from a folded or non-upright position to the upright position, or interact with a handle, or other mechanism, for the seat track mechanism 11, thereby simplifying the operation for the user. For example, the seat back 12 is movable relative to the seat base 14, and the seat base 14 is movable relative to the tracks 19, when a force is imparted on the seat back 12 by a user, unless the seat is in the locked upright position.

The mechanism 34, which contains the spring 32 and follower 28, is illustrated as a pull type mechanism where the follower 28 is pulled along the cam surface 22 as the seat back is returned to the upright position.

The spring member 32 is a leaf spring, or other spring as is known in the art to provide a compressive force when the follower 28 is biased away from the cam surface 22. The spring member 32 has a first end region connected to the seat base 14. The follower 28 is rotatably connected to the second end region of the spring member 32. For example, the spring member 32 is curved such that the second end region and first end region are adjacent to one another, such that the spring 32 resembles a U-shape. The follower rotates with respect to the spring member 32 such that the follower 28 rotates or rolls along the cam surface 22. The friction and wear between the follower 28 and the cam surface 22 is reduced due to the rolling movement. There is rolling friction between the follower 28 and the cam surface 22, but there is little or no sliding friction between the two.

A damper 36 may be positioned within the spring member 32 such that it is in contact with the spring member 32. The damper 36 is placed within the interior of the spring member 32 to damp the motion of the spring member 32 and/or provide additional resistance to compression. For example, the damper 36 is positioned on an internal side of the spring member 32 to act as a buffer for the follower 28 and increase the amount of force to compress the spring 32 and allow the follower 28 to roll along the cam surface 22. The damper 36 may be connected to the spring member 32 using molded in clips, an adhesive, a mechanical fastener, or otherwise as is known in the art. For example, the damper 36 is an elastomeric block, such as rubber, which may be shaped to correspond with the shape of the bend in the spring member 32.

The spring member 32 has a bracket 38 extending from the second end region which is used to fasten the follower 28 to the spring member 32 and allow the follower 28 to rotate with respect to the spring member 32. For example, the follower 28 is fastened to the bracket 38 using mechanical fasteners, a bearing assembly, or other fastener which permits rotational movement as is known in the art.

Figure 3:
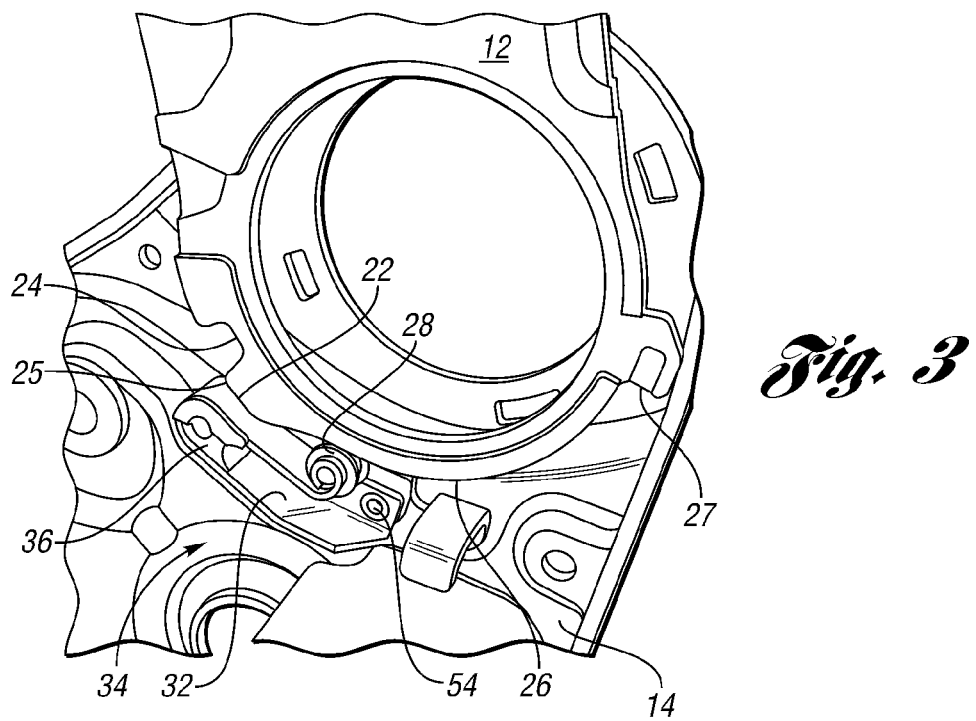
FIG. 3 is another schematic of a mechanism assembled with a seat assembly according to the present disclosure.

Another seat release mechanism 34 for use with the seat assembly 10 is shown in FIG. 3. Elements which are similar to those described previously with respect to FIGS. 1-2 are given the same reference numerals as previously used. The mechanism 34, which contains the spring 32 and follower 28, is illustrated as a push type mechanism where the follower 28 is pushed along the cam surface 22 as the seat back is returned to the upright position.

With respect to FIG. 3, the seat back 12 is shown in a partially reclined orientation with respect to the seat base 14. The follower 28 engages the cam surface 22 as shown. The follower 28 is connected to a spring member 32, such a leaf spring, which is connected to the seat base 14. The spring member 32 has a damper 36. The spring member 32 may be connected to the seat base 14 using a mechanical fastener 54, such as a rivet or a bolt.

The follower 28 rolls along the cam surface 22. When the seat back 12 is in the folded forward position, the follower 28 is engaged with the notched portion 24. When the seat back 14 is in the locked upright position, the follower 28 is engaged with an end stop 27, or is not in contact with the cam surface 22 at all. As the seat 10 moves between the upright position (with the seat back 14 locked and upright and the seat base 14 locked rearward) and the folded position (with the seat back 12 folded forward and unlocked and the seat base 14 unlocked on the tracks 19), the follower 28 rolls along the cam surface 22.

The cam surface 22 has a profile with features of various heights to cause specific sequences of movements of the seat 10. The follower 28 is engaged with the notch 24, or arcuate concave portion, when the seat 10 is folded forward in the easy entry configuration. A high profile region 25 is adjacent to the notch 24, and the notch 24 has a steep region, to create a higher compression of the spring 32 over that section of the cam surface 22. This causes the seat base 14 to translate before the seat back 12 rotates when the seat 10 is being moved from a folded position to an upright position. The resistance of the follower rolling out of the notch 24 with the seat unfolding is higher than the sliding resistance of the seat base 14 along the tracks 19, thereby causing the seat base 14 to move before the seat back 12 rotates. Once the seat base 14 is locked into position on the tracks 19 by the mechanism 11, the force exerted by the user on the seat back 12 will cause the follower 28 to exit the notch 24, roll over the high profile region 25, and along the second portion 26 as the seat back 12 reclines to the upright position and the follower 28 reaches the end stop 27.

When the follower 28 is engaged with the cam surface 22, including the notch 52, the seat back 12 may be moved without any actuation of the seat release mechanism 16 or the sliding track mechanism 11. The user may simply move the seat back 12 and/or the seat base 14 by imparting a force directly on the seat back 12.

Figure 4:
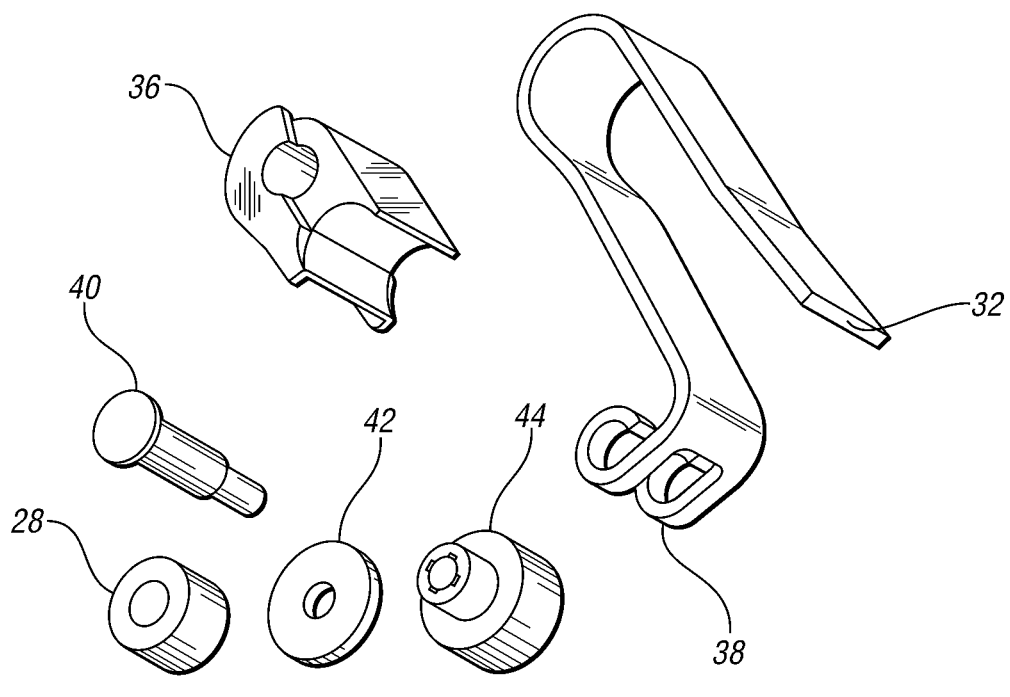
FIG. 4 is an exploded view of the folding mechanism of FIG. 3.

Referring now to FIG. 4, an exploded view of the mechanism 34 is illustrated. The mechanism 34 may be used with the embodiments shown in FIGS. 2-3. The follower 28 is attached to the spring member 32 using a mechanical fastener such as a bolt 40, washer 42, and nut 44 assembly, or the like, which permits the follower 28 to rotate with respect to the spring member 32. Alternatively, the follower 28 is connected to the spring member 32 using a bearing assembly to provide for the rotational movement of the follower 28. The spring member 32 has a bracket 38, which may have a pair of cylindrical members or the like, to support the fastener, bearing assembly, or the like.

The spring member 32 is a leaf spring, or other spring member, which may be compressed as the follower 28 engages the cam surface 22. A damper 36 is shaped to fit within an interior region of the spring member 32 to additionally resist compression.

Referring the FIGS. 1-4, the release mechanism 16 is described as having the cam surface 22 on the seat back 12 and the mechanism 34 on the seat base 14. Alternatively, the cam surface 22 could be defined by the seat base 14 and the follower 28 may be connected to the seat back 12 using the disclosure provided herein.

The seat release mechanism 16, including the cam surface 22 and mechanism 34, may be located on both the inboard and outboard sides of a vehicle seat assembly 10. The outboard side is the side of the vehicle seat assembly 10 adjacent to the outboard side of the vehicle when the seat assembly 10 is installed. The inboard side of the vehicle seat 10 is the side of the vehicle seat 10 adjacent to the longitudinal axis of the vehicle when the seat 10 is installed, or opposite to the outboard side of the seat 10. Alternatively, the seat release mechanism 16 may be positioned on the outboard side of the vehicle seat 10 only. This would mean that for a pair of seats 10 for a vehicle, e.g. the driver seat and front passenger seat, the release mechanisms 16 are installed on opposing sides of the respective seats 10. The release mechanism 16 is on the left, or outboard, side of the driver seat 10. The release mechanism 16 is on the right, or outboard, side of the front passenger seat 10.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle seat assembly comprising:
   a seat base;
   a seat back pivotally connected to the seat base and being movable between an upright and a folded position, wherein one of the seat base and the seat back defines a cam surface;
   a leaf spring member with a first end region connected to the other of the seat base and the seat back; and
   a follower rotatably connected to the spring member, the spring member being compressed by the follower engaging the cam surface;
   wherein the follower engages the cam surface when the seat back is in the folded position.

2. The vehicle seat assembly of claim 1 wherein the cam surface has a first portion and a second portion, the first portion having a concave arcuate profile.

3. The vehicle seat assembly of claim 1 wherein from the folded position, the seat back is pivotable relative to the seat base with a force imparted on the seat back, such that the follower travels along the first portion of the cam surface and then along the second portion of cam surface until the seat back is in the upright position relative to the seat base.

4. The vehicle seat assembly of claim 1 wherein the spring member is compressed during a transition when the follower moves between the first portion and the second portion of the cam surface.

5. The vehicle seat assembly of claim 1 further comprising a seat release mechanism connected to the seat back, wherein the seat release mechanism is actuatable to release the seat back to pivot relative to the seat base from the folded upright position toward the folded position, and wherein the seat back is pivotable from the folded position toward the upright position without requiring actuation of the seat release mechanism.

6. The vehicle seat assembly of claim 5 further comprising a sliding track mechanism connected to the seat base and the seat release mechanism, wherein the seat release mechanism is actuatable to translate the seat base relative to the sliding track mechanism.

7. The vehicle seat assembly of claim 6 wherein the follower is engagable with the cam surface, such that the seat base translates with respect to the sliding track mechanism before the seat back pivots towards the upright position with respect to the seat base.

8. The vehicle seat assembly of claim 1 wherein the follower is rotatably connected to a second end region of the spring member.

9. The vehicle seat assembly of claim 8 wherein the spring member is curved such that the second end and first end are adjacent to one another.

10. The vehicle seat assembly of claim 9 further comprising a damper in contact with the spring member.

11. The vehicle seat assembly of claim 10 wherein the damper is an elastomeric block.

12. The vehicle seat assembly of claim 10 wherein the damper is positioned on an internal side of the spring member to act as a buffer for the follower.

13. The vehicle seat assembly of claim 1 wherein the spring member has a bracket extending from an end region, the bracket for use in rotatably connecting the follower to the spring member.

14. The vehicle seat assembly of claim 13 further comprising a bearing assembly rotatably connecting the follower to the bracket of the spring member.

15. A vehicle seat assembly comprising:
a seat base having a track to translate thereon;
a seat back pivotally connected to the seat base and being movable between an upright position and a folded position, wherein one of the seat back and the seat base defines a cam surface;
a spring member connected to the other of the seat back and the seat base;
a follower rotatably connected to the spring member, the follower configured to engage the cam surface when the seat back is pivoted between the folded position and the upright position; and
a seat release mechanism connected to the seat back, the seat release mechanism being configured release the seat back from the upright position and cause the seat base to translate along the track;
wherein the seat back is disengaged from the upright position through actuation of the seat release mechanism; and
wherein the seat back is reengaged to the upright position by moving the seat back relative to the seat base without actuating the seat release mechanism; and
wherein the cam surface is shaped such that the seat base translates with respect to the track before the seat back pivots towards the upright position with respect to the seat base.

16. The vehicle seat assembly of claim 15 wherein the spring member is a leaf spring having proximal and distal end regions, the proximal end region being connected to the other of the seat back and the seat base, and the distal end region being connected to the follower, and wherein the spring member is curved such that the proximal end region and distal end region are adjacent to one another.

17. A vehicle seat assembly comprising:
a seat base;
a seat back pivotally connected to the seat base and being movable between an upright and a folded position, wherein one of the seat base and the seat back defines a cam surface;
a spring member connected to the other of the seat base and the seat back;
a follower rotatably connected to the spring member, the spring member being compressed by the follower engaging the cam surface, wherein the follower engages the cam surface when the seat back is in the folded position;
a seat release mechanism connected to the seat back, wherein the seat release mechanism is actuatable to release the seat back to pivot relative to the seat base from the folded upright position toward the folded position, and wherein the seat back is pivotable from the folded position toward the upright position without requiring actuation of the seat release mechanism; and
a sliding track mechanism connected to the seat base and the seat release mechanism, wherein the seat release mechanism is actuatable to translate the seat base relative to the sliding track mechanism.

18. The vehicle seat assembly of claim 17 wherein the follower is engagable with the cam surface, such that the seat base translates with respect to the sliding track mechanism before the seat back pivots towards the upright position with respect to the seat base.

* * * * *

UNITED STATES PATENT AND TRADEMARK OFFICE
CERTIFICATE OF CORRECTION

PATENT NO. : 8,777,314 B2  
APPLICATION NO. : 13/439399  
DATED : July 15, 2014  
INVENTOR(S) : Eckhard Nock et al.

Page 1 of 1

It is certified that error appears in the above-identified patent and that said Letters Patent is hereby corrected as shown below:

In the Claims

Column 7, Line 33, Claim 15:

After "seat release mechanism being configured"  
Insert -- to --.

Signed and Sealed this  
Seventh Day of October, 2014

Michelle K. Lee  
*Deputy Director of the United States Patent and Trademark Office*